(12) United States Patent
Lester

(10) Patent No.: US 11,035,447 B1
(45) Date of Patent: Jun. 15, 2021

(54) PHASE ANGLE CONTROL SYSTEM FOR INFINITELY VARIABLE TRANSMISSION

(71) Applicant: William Terry Lester, Fort Worth, TX (US)

(72) Inventor: William Terry Lester, Fort Worth, TX (US)

(*) Notice: Subject to any disclaimer, the term of this patent is extended or adjusted under 35 U.S.C. 154(b) by 0 days.

(21) Appl. No.: 16/401,266

(22) Filed: May 2, 2019

(51) Int. Cl.
*F16H 29/22* (2006.01)
*F16H 29/04* (2006.01)
*F16H 61/662* (2006.01)
*F16H 59/42* (2006.01)
*F16H 59/70* (2006.01)
*F16H 59/74* (2006.01)
*F16H 59/40* (2006.01)

(52) U.S. Cl.
CPC ............ *F16H 29/22* (2013.01); *F16H 29/04* (2013.01); *F16H 61/662* (2013.01); *F16H 59/40* (2013.01); *F16H 59/42* (2013.01); *F16H 59/70* (2013.01); *F16H 59/74* (2013.01); *F16H 2059/704* (2013.01); *F16H 2059/743* (2013.01)

(58) Field of Classification Search
None
See application file for complete search history.

(56) References Cited

U.S. PATENT DOCUMENTS

| | | | | |
|---|---|---|---|---|
| 3,805,514 A * | 4/1974 | Bodine | ..................... | F03G 3/08 60/698 |
| 6,044,718 A * | 4/2000 | Lester | ..................... | F16H 29/02 475/14 |
| 6,062,096 A * | 5/2000 | Lester | ..................... | F16H 29/02 475/16 |
| 7,481,127 B2 * | 1/2009 | Lester | ..................... | F16H 29/02 74/119 |
| 8,967,007 B2 * | 3/2015 | Lester | ..................... | F16H 33/08 74/119 |

* cited by examiner

*Primary Examiner* — Timothy Hannon
(74) *Attorney, Agent, or Firm* — Richard Eldredge; Leavitt Eldredge Law Firm

(57) ABSTRACT

The invention is an improvement for the infinitely variable transmission (IVT) that utilizes oscillating torque to vary the mechanical power transmitted to a load. The invention provides the torque amplitude control system that is a compact device that adjusts the torque amplitude by controlling the phase angle between the forward and aft drive units for the IVT. The IVT is transmission which transfers the engine torque and power to the driveshaft, differential and wheels of an automobile. The torque is generated from centrifugal forces of masses in the forward and aft drive unites of the input assembly.

2 Claims, 18 Drawing Sheets

PHASE ANGLE CONTROL SYSTEM FOR INFINITELY VARIABLE TRANSMISSION

BACKGROUND

1. Field of the Invention

The present invention relates to transmissions of the type that are used to regulate the transmission of power from an engine or a prime mover to a load, such as are used in automobiles and trucks.

2. Description of Related Art

Transmissions are used in a variety of applications to change the speed and torque provided by an engine or prime mover. One popular application of transmissions is in an automobile. In an automobile, the transmission is connected between the engine and the driveshaft, differential and wheels.

Prior art automobiles utilize fixed ratio transmissions. These transmissions have a set of gears that provide a few fixed and discrete speed ratios between the input from the engine and the output to the tires. Engine revolutions per minute (rpm) varies over a wide range for each speed ratio. Because the engine must operate over a wide range of speed, its overall efficiency is reduced.

Infinitely Variable Transmissions (IVT) offer a way to boost engine efficiency. Unlike fixed ratio transmissions, IVTs offers a wide range of speed ratios between the input from the engine and the output to the tires. This allows the engine to operate over a narrow range of optimum rpm's, wherein the engine efficiency can be increased. By varying the speed ratio, the engine speed can be maintained in its optimum range, even for a variety of driving conditions, thereby improving fuel efficiency.

Previous Patents by this inventor (U.S. Pat. Nos. 6,062,096, 6,044,718, 7,481,127 and 8,967,007) disclose a IVT that utilizes rotating eccentric masses to produce an oscillating torque. The oscillating torque is converted into one way torque by one way drives or clutches.

The inventions herein are refinements to the previously patented design to provide an alternate methods of controlling the output torque.

SUMMARY OF THE INVENTION

It is an object of the present invention to improve the previously disclosed infinitely variable transmission (IVT) that utilizes oscillating torque to vary the output toque. The present invention controls the torque amplitude as opposed to speed ratio. The IVT has the capability to deliver zero torque output to the full torque output without clutching or torque conversion at the input. The power from the centrifugal forces of rotating masses is harnessed to create an oscillating torque. One-way clutches convert the oscillating torque to a unidirectional torque. Variable control of the amplitude of the torque results from the change of the phase angle between the forward and aft drive units of the input assembly.

The IVT consist of three main component groups which are known as the input assembly, arm assembly and output assembly. The input assembly is the rotating component that produces the oscillating torque and is directly connected to the engine or power source. The arm assembly is the structural interface between the Input Assembly and the Output Assembly. The output assembly converts the oscillating torque into a unidirectional torque and is the output interface.

The improvements provide the torque amplitude control system that is a compact device and adjusts the torque amplitude by controlling the phase angle between the forward and aft drive units of the input assembly of the IVT. The device consists of sensors, an electronic control unit (ECU), mechanical components and embedded software. The sensors measure the IVT input speed (rpm), IVT output speed (rpm), the phase angle between the forward and aft input drive units and engine parameters. The ECU is an embedded electronic system. The mechanical components is the structural and actuator parts. The embedded software is the control system computer software.

The sensors measure the IVT input speed (rpm), IVT output speed (rpm), phase angle between the forward and aft drive units and engine data. This data from the sensor measurements are provided the real time to the ECU.

The ECU is a printed circuit board (PCB) that processes the sensor measurements, executes the embedded software and sends commands to the brake actuators to adjust the phase angle between the forward and aft input drive units of the input assembly. The ECU and wires are not shown in the figures.

The embedded software is the computer code that processes the sensor measurements, calculates new phase angle between the forward drive unit and the aft drive unit and sends the commands to the brake actuator to change the phase angle to the new value.

The mechanical components are the structural and actuator parts which are used to maintain and adjust the phase angle between the forward and aft drive units. The mechanical components are installed in between the forward drive unit and the aft drive unit. The mechanical components are an indexing clutch, two calipers, two brake discs, planetary gear set, and support structure. The calipers are fixed to the casing while the brake discs are attached the drive units. One the caliper and brake disk is used to increase the phase angle while the other pair reduces the phase angle. The planetary gear set is used reverse the direction of the torque of one set of the calipers and brake disk. The planetary gear set consist of a sun gear, idler gears, and a ring gear.

The indexing clutch is in a lock-lock setting when there is no torque from the calipers. The indexing clutch changes to a free-wheel and lock setting when the one of the brakes applies torque to the clutch. The free-wheel direction is in the direction of the applied torque. Only one of the brakes operate at any instant of time.

The time duration for changing the phase angle from maximum torque to zero torque is less than 0.20 seconds with a braking torque less than 20 lb-ft. The time duration for changing the phase angle from zero torque to maximum torque is less than 1.00 seconds with a braking torque less than 150 lb-ft for worst case. The time duration for small changes in the phase angle will take less than 0.20 seconds. These analysis predictions are from the physics based model for the Phase II Orbital IVT™ design.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
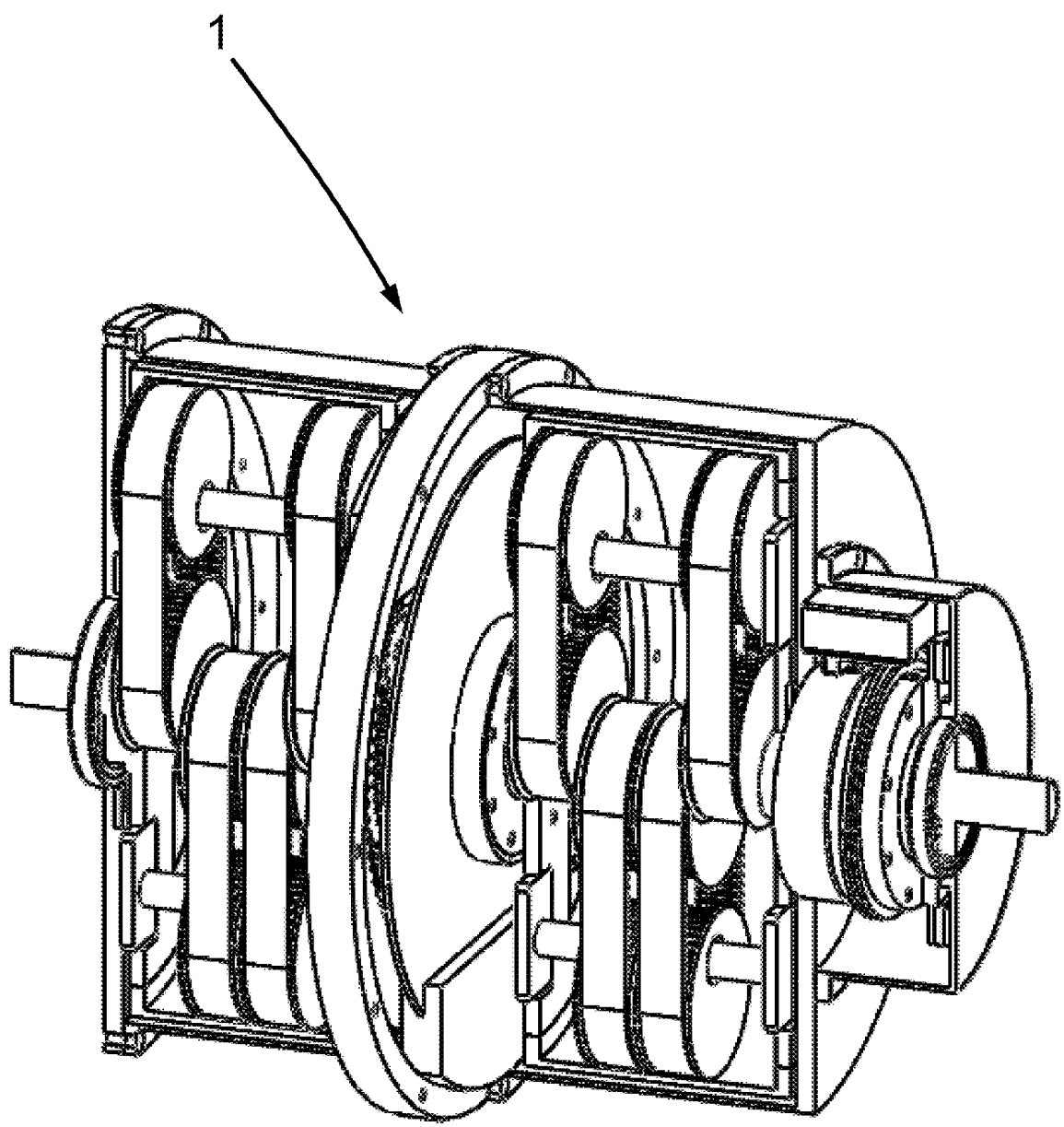
FIG. 1 is an overall isometric view of the present invention installed in the IVT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-18 depict various views of the system and elements of the system in accordance with the present application. It should be appreciated that the system provides for the improvements discussed above.

In FIG. 1, a infinitely variable transmission (IVT) (1) is shown to which the torque amplitude control system of the present invention is provided as an improvement.

Figure 2:
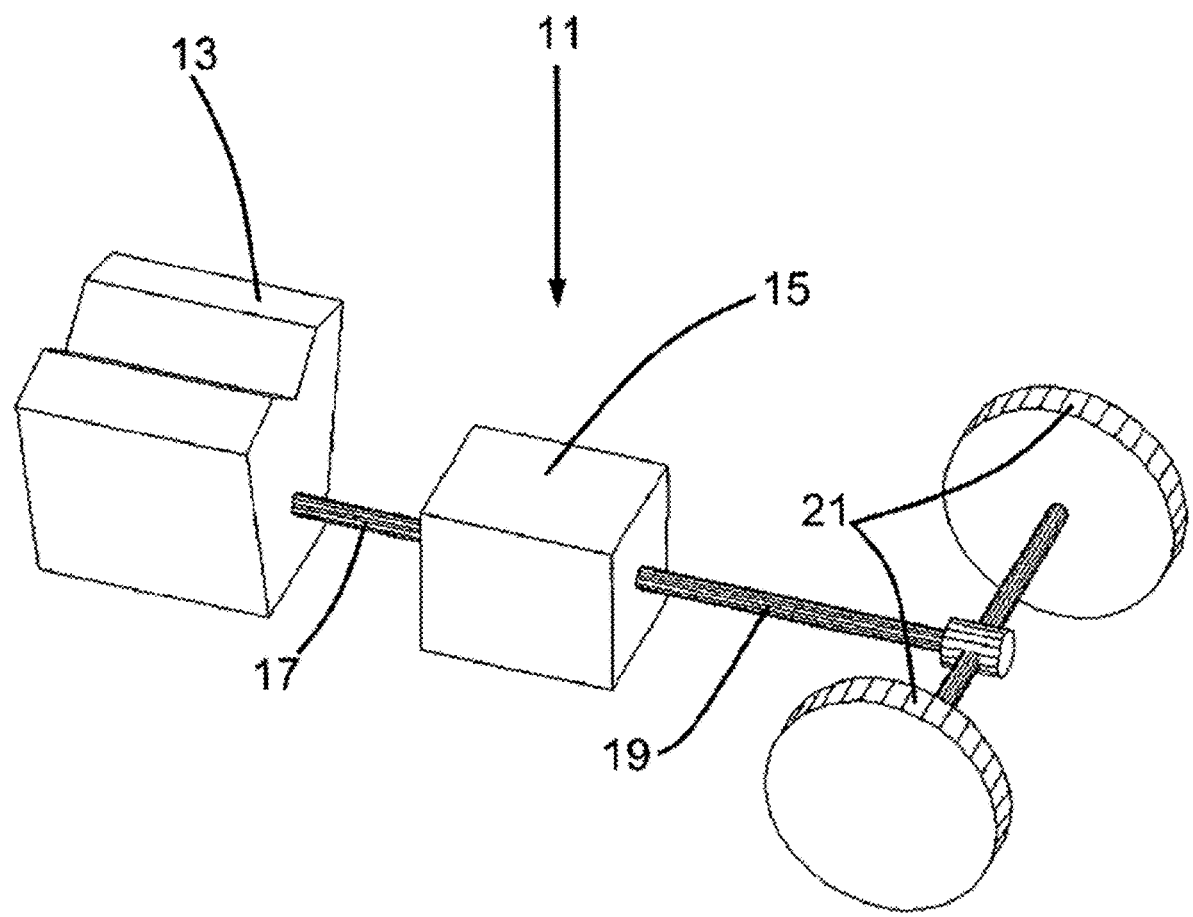
FIG. 2 is a schematic view of a vehicle drivetrain, showing the transmission of the present invention

In FIG. 2, a schematic diagram of a vehicle power system (11) is shown. The system (11) having a prime mover (12), a transmission (15), and an output load (21). The prime mover (13) is typically an internal combustion engine that can be powered by gasoline, diesel, natural gas, etc. Alternatively, the prime mover (13) can be electric motors or some other source of power.

The transmission (15) is that of the prior art, shown in accordance with a preferred embodiment. The transmission (15) has an input (17) that is connected to the prime mover (13) and an output (19) that is connected to the load (21). The load (21) is shown as being a drive shaft and vehicle wheels.

The transmission (15) is of an infinitely variable transmission type. Many internal combustion engines (and electric motors) operate more efficiently within a narrow range of engine speeds. An infinitely variable transmission can be provided with a narrow range of input speed and produce a wide range of output speeds for the load. Unlike prior art gear transmissions, where each output speed has a specific gear, an infinitely variable transmission provides a continuous output of speeds. This allows the engine to operate within a narrow, and thus more efficient, range of speeds.

The IVT 1, consist of three main component groups which are known as the input assembly (29), arm assembly (31), and output assembly (33). The input assembly (29), is the rotating component that produces the oscillating torque and is directly connected to the engine or prime mover (13). The arm assembly (31), is the structural interface between the input assembly (29), and the output assembly (33). The output assembly converts the oscillating torque into a unidirectional torque and is the output interface. See FIGS. 3 through 7.

Figure 3:
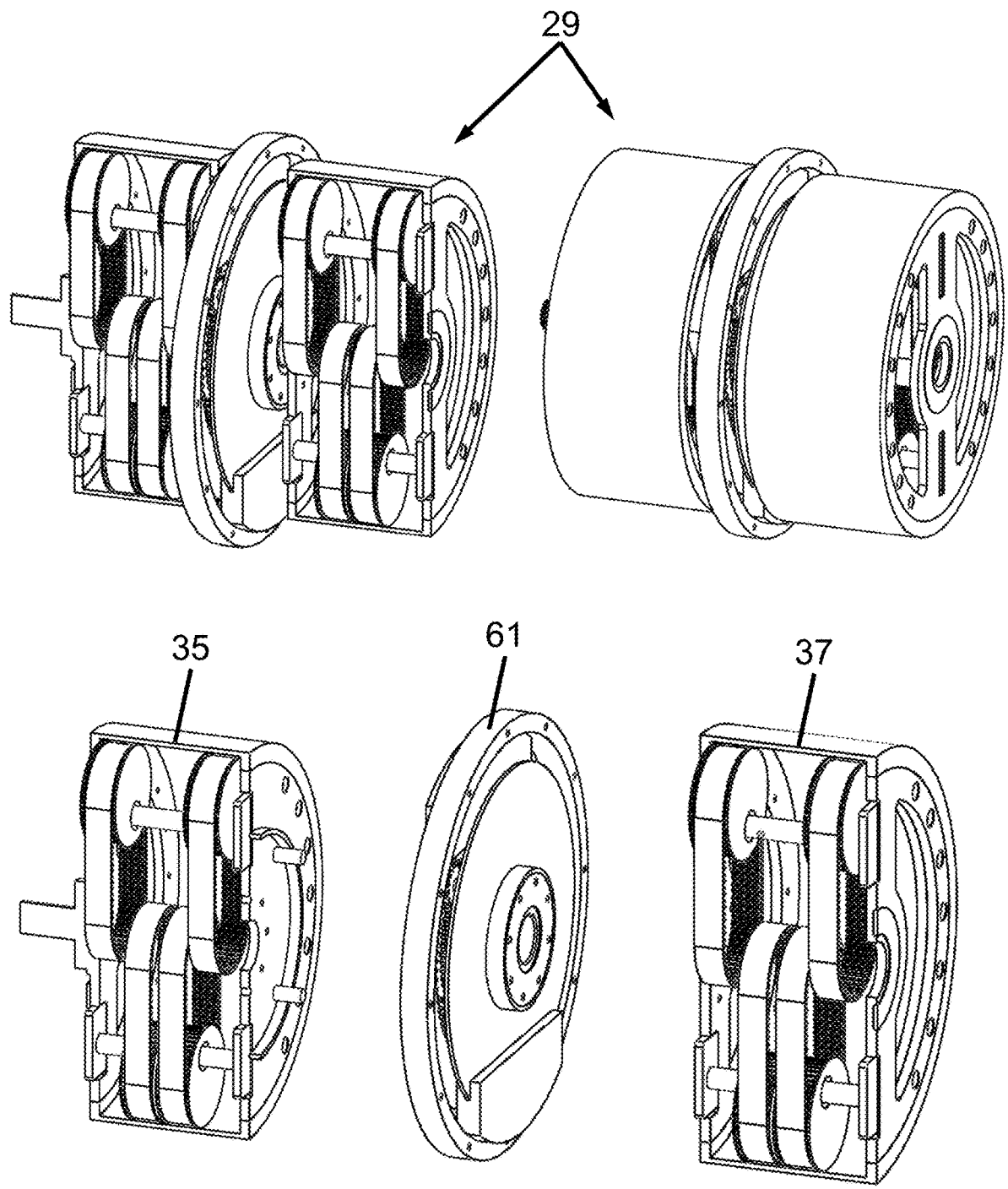
FIG. 3 is isometric view of the input assembly of the IVT
Figure 4:
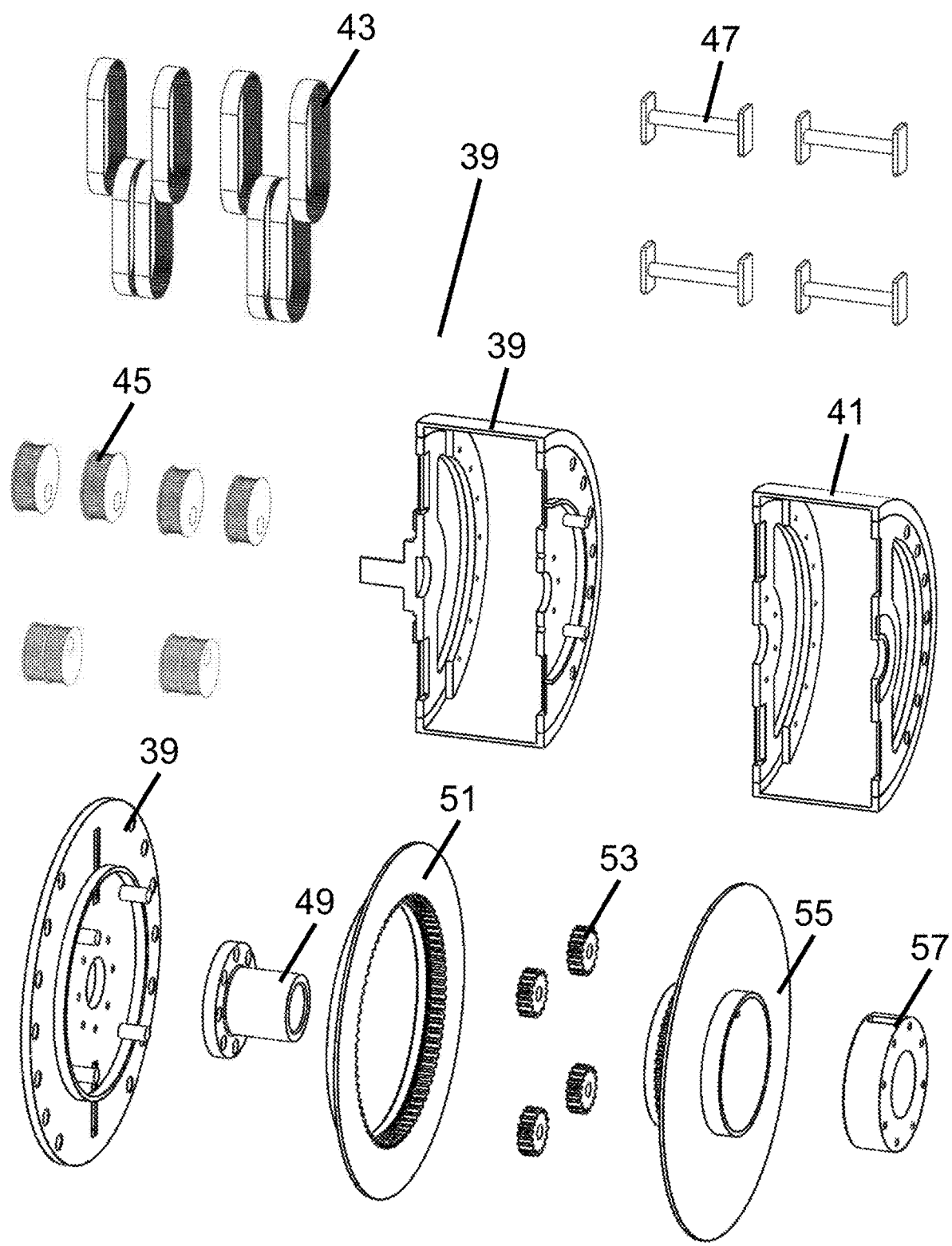
FIG. 4 is isometric view of the input assembly components
Figure 5:
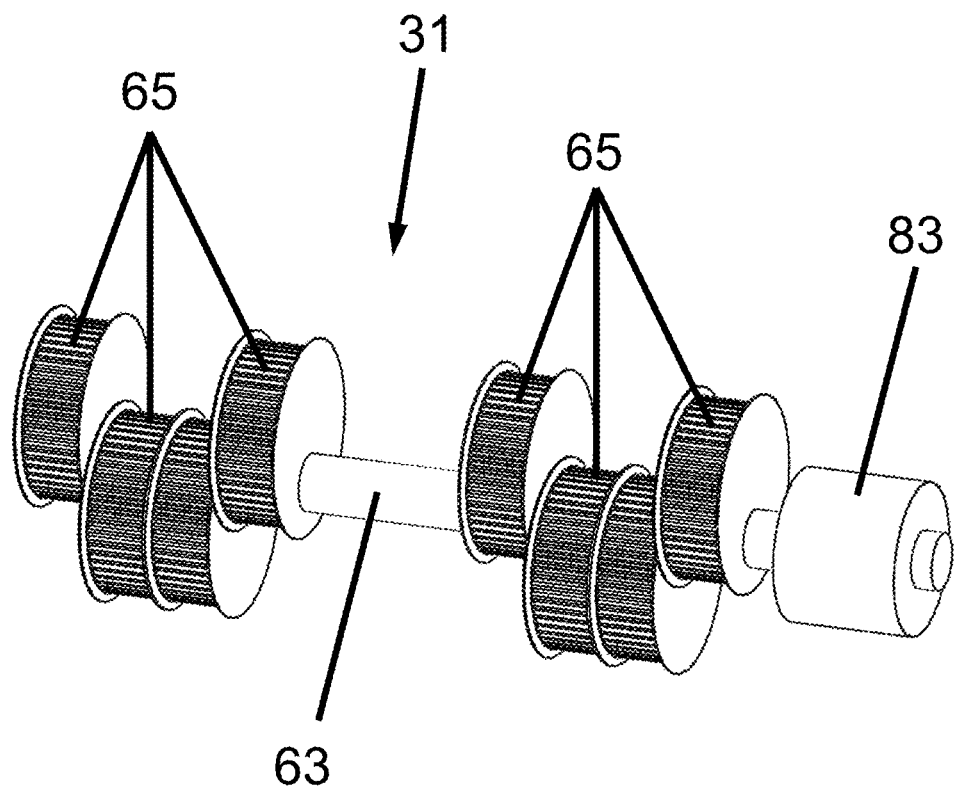
FIG. 5 is isometric view of the arm assembly of the IVT
Figure 6:
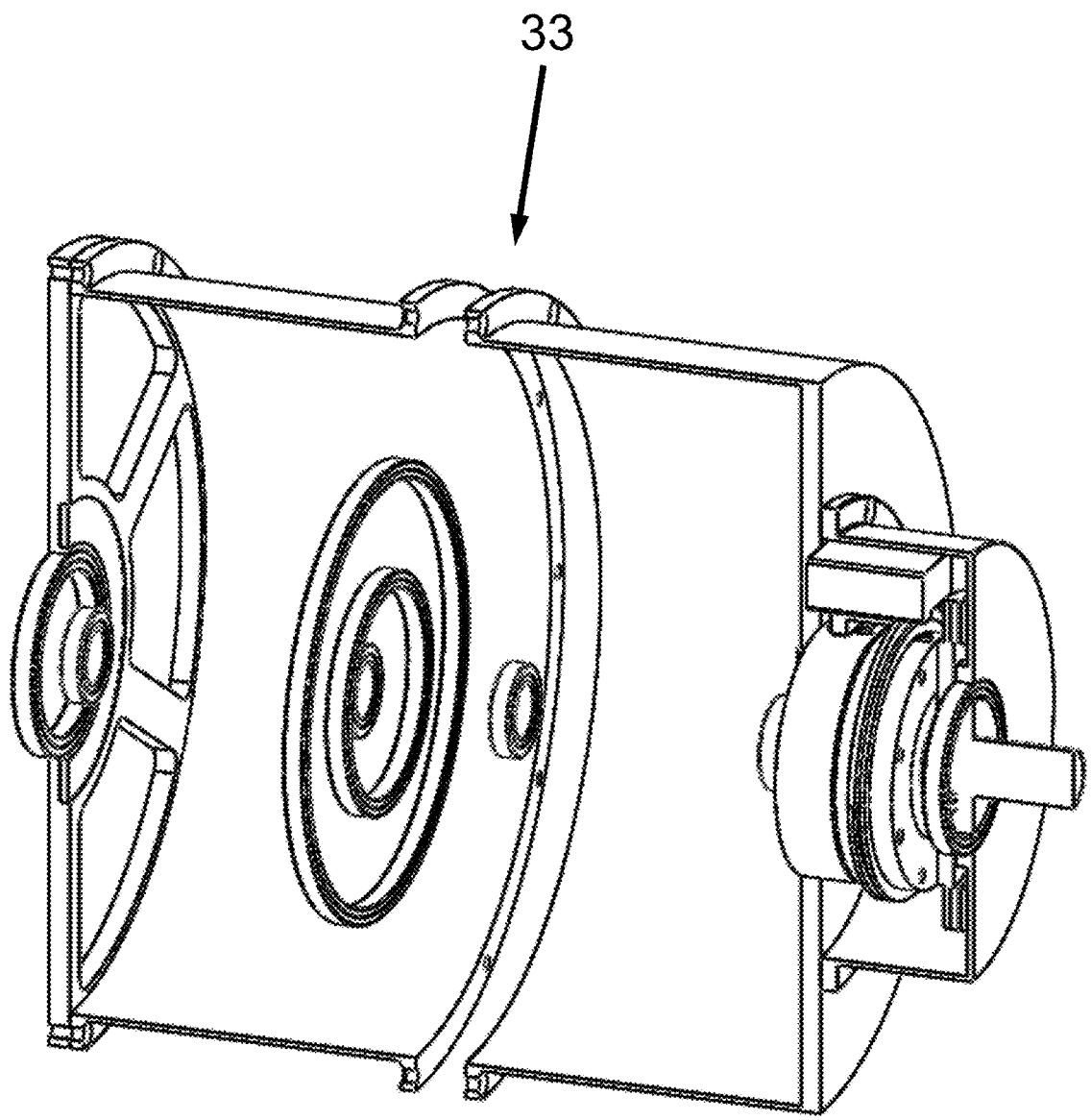
FIG. 6 is isometric view of the output assembly of the IVT
Figure 7:
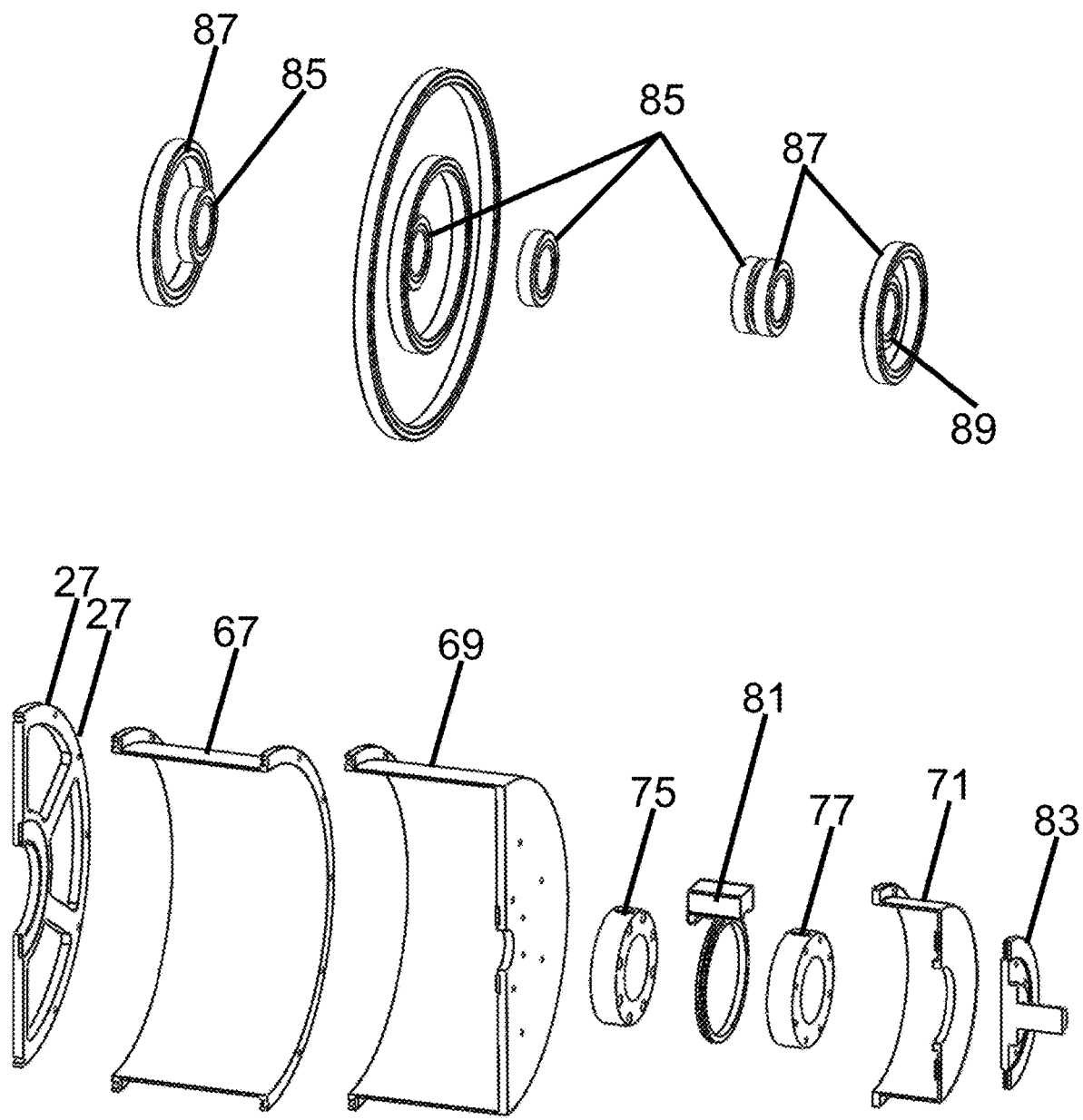
FIG. 7 is isometric view of the output assembly components

As shown in FIGS. 3 and 4, Input Assembly (29) produces the oscillating torque where its components are the forward drive unit (35), aft drive unit (37), forward drive support structure (39), aft drive support structure (41), timing belts (43), rotatable masses (45), drive shafts (47), clutch shaft (49), disk and ring gear (51), idler gears (53), disk and sun gear (55), indexing clutch (57).

The input assembly (29), consists of the forward drive unit (35), and aft drive unit (37). The input assembly (29), rotates about the arm assembly (31), shown in FIG. 5, at the output rpm of the engine or prime mover (13). The input interface, is the connection to the engine or prime mover (13), by means of a spline connection.

Each drive unit (35) (37), has two plates and a cylinder that make up the forward and aft support structures (39) (41). The cylinders are capable of transferring high torque between the plates. Half of the cylinders are cut away for visualization of the components in FIGS. 3 and 4.

The Control System of the present invention is the structural interface between the forward and aft input drive units (35) (37), and provides the infinitely variable torque by adjusting the phase angles between the two drive units (35) (37). The control system, is a compact unit that fits between the forward and aft input drive units (35) (37), shown in FIG. 3.

The rotatable masses (45), are the masses which generate the centrifugal forces. The rotatable masses (45), are sprockets. The rotatable masses (45), are constrained in the input assembly (29) by the drive shafts (47), and the timing belts (43). The drive shafts (47), transfers the power from the engine to the rotatable masses (45). The timing belts (43), tethers the rotatable masses (45) to the arm assembly (31). Needle bearings are placed in the rotatable masses (45), to facilitate the rotation of the drive shafts (47).

The ends of the drive shafts (47) are inserted into slots in the plates of the forward and aft support structure (39) (41). In these slots these is ample free play so that none of the centrifugal forces of the rotatable masses (45), are transferred to the plates.

Arm assembly (31) supplies the structural interface between the input assembly (29) and the output assembly (33) where its component consist of shaft (63) and sprockets (65). The arm assembly (33) resembles a crankshaft and operates as the structural interface between the input assembly (29) and output assembly (33). It is a shaft (63), with eccentrically attached sprockets (65). The moment arm for the output torque is defined as the distance from the center of the shaft (63) to the center of the sprockets (65). The arm assembly (31) is rotatably coupled to the forward, mid and aft casings (67), (69) (71). The aft section of the shaft functions as the coupling component for the output assembly clutches (75) (77).

Output assembly (33), converts the oscillating torque into unidirectional torque where its components consists of forward casing (67), mid casing (69), aft casing (71), alignment bearings, casing clutch (75), output clutch (77), shifter (81), and output interface (83). The casing (67) (69) (71), acts as a stationary support structure for the assembled IVT. The casing (67) (69) (71), and the clutches (75) (77), are one-way indexing clutches. These one-way indexing clutches, functioning in directions reversed from one another, convert the oscillating torque to a unidirectional torque. The casing clutch (75) connects the arm assembly to the casing; the output clutch (77), connects the arm assembly (33), to the output interface (83).

The shifter (81) changes the operation of the IVT to forward, park or reverse. This is achieved by changing the action of the casing clutch (75) and output clutch (77). The action options of the clutches (75) (77), are clockwise locking with counterclockwise freewheel, counterclockwise locking with clockwise freewheel, and lock-lock, which locks the clutch in both directions. There are three groups of alignment bearings (85) (87) (89), which are the input assembly alignment bearings (85) maintain the alignment between the input assembly (29) and the arm assembly (31), second the arm assembly alignment bearings (87), maintain the alignment between the arm assembly (31), and the casing (67) (69) (71), and third the output alignment bearing (89), maintains alignment between the output clutch (77), and the casing (67) (69) (71). These alignment bearings (85) (87) (89), will have a long endurance life and will not require any special lubrication because none of these bearing are exposed to any significant radial loads.

Figure 8:
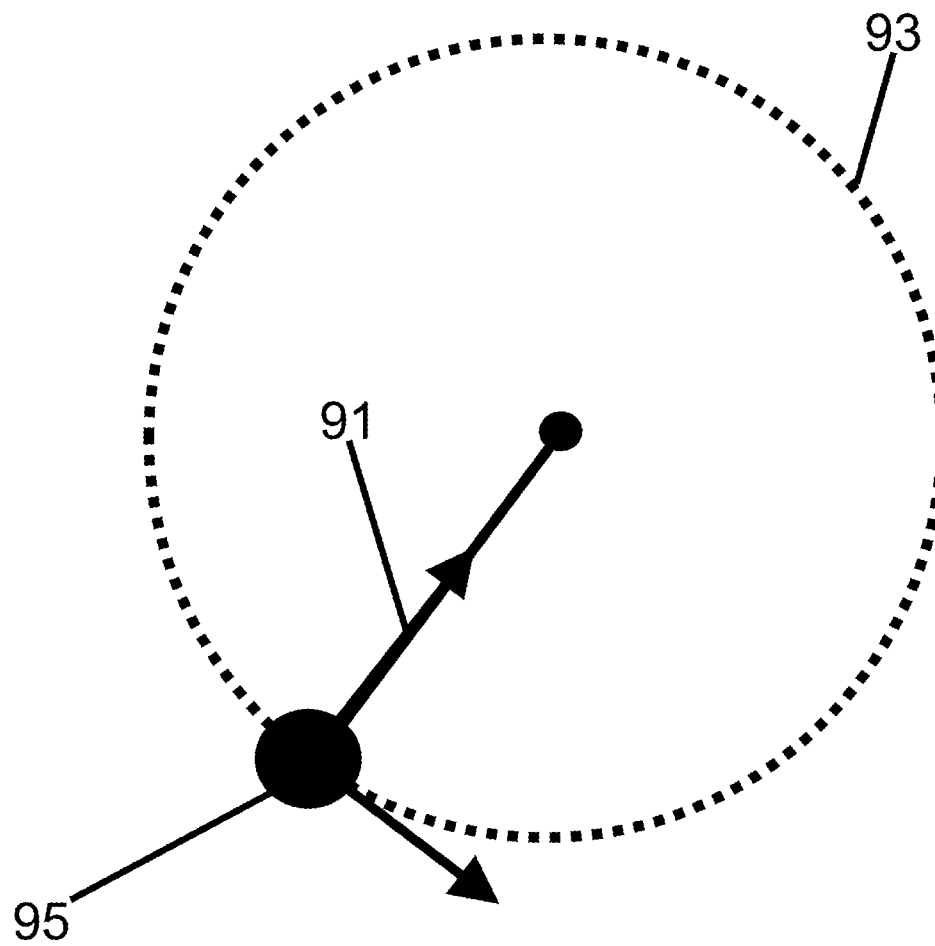
FIG. 8 is reference figure for centrifugal force of a rotating mass

The centrifugal force (91), is the force required to redirect the motion of a mass about a circular path (93), FIG. 8. Large centrifugal forces are produced with a small mass (95). A small mass (95), of 10 pounds traveling about a circular path (93), with a radius of 5 inches at 3,200 rpm generates a centrifugal force (91), of 14,500 pounds. This centrifugal force is harnessed by the Orbital IVT™ design to transfer the torque and power to the vehicles' axle, differential and wheels.

Figure 9:
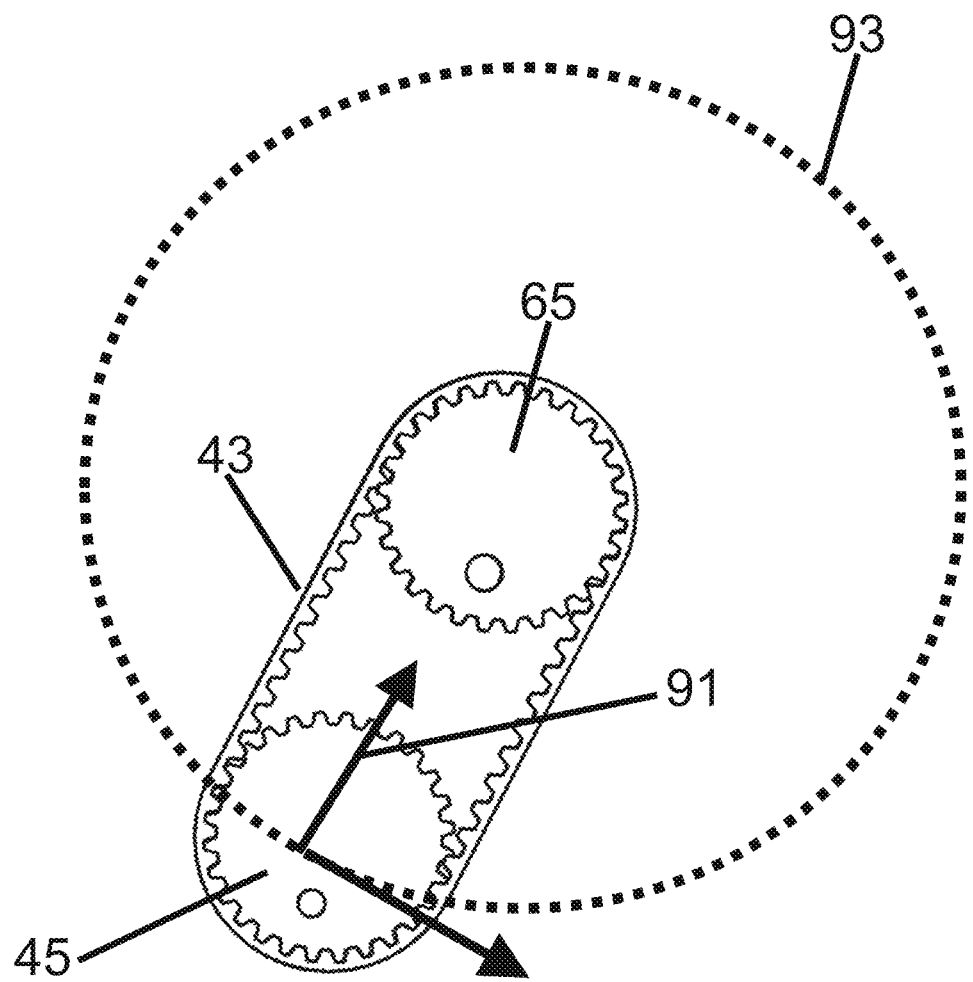
FIG. 9 is timing belts used to tether the rotatable masses to the sprockets of the arm assembly

Timing belts (43), are used to the tether the rotatable masses (45), to the sprockets (65), of the arm assembly (31), FIG. 9. The timing belts (43), are capable of transferring the large centrifugal forces (91), of the rotatable masses (45) to the arm assembly (31), while its mechanical losses are negligible. A timing belt (43), is required because the motion of the rotatable masses (45), relative to arm assembly (31) must be synchronized.

The oscillating torque is generated as the rotatable masses rotate (45), around the Arm Assembly (31). FIGS. 6 through 9 illustrate how the oscillating torque is generated. In these figures the profiles of two rotatable masses (45), are shown with respective timing belts (43), and arm assembly sprockets (65). The rotatable masses (45), are labeled A and B. The two rotatable masses (45), are translating about a clockwise circular path 93, around the arm assembly (31). The arm assembly (31), does not rotate in FIG. 10 through (13) so that it's easier to visualize the generation of the torque. The arm assembly (31), would rotate during the actual operation of the IVT.

Figure 10:
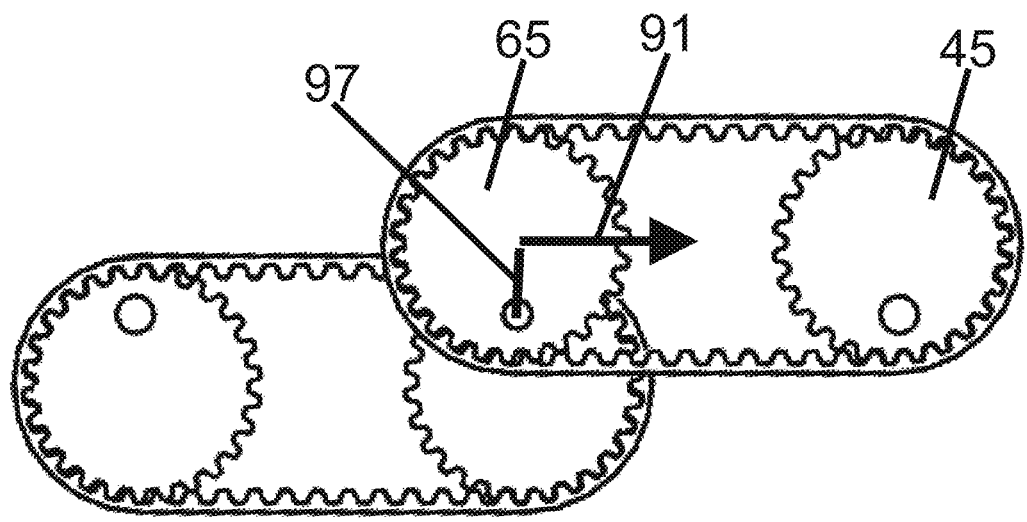
FIG. 10 is clockwise torque from the centrifugal forces from the rotatable masses
Figure 11:
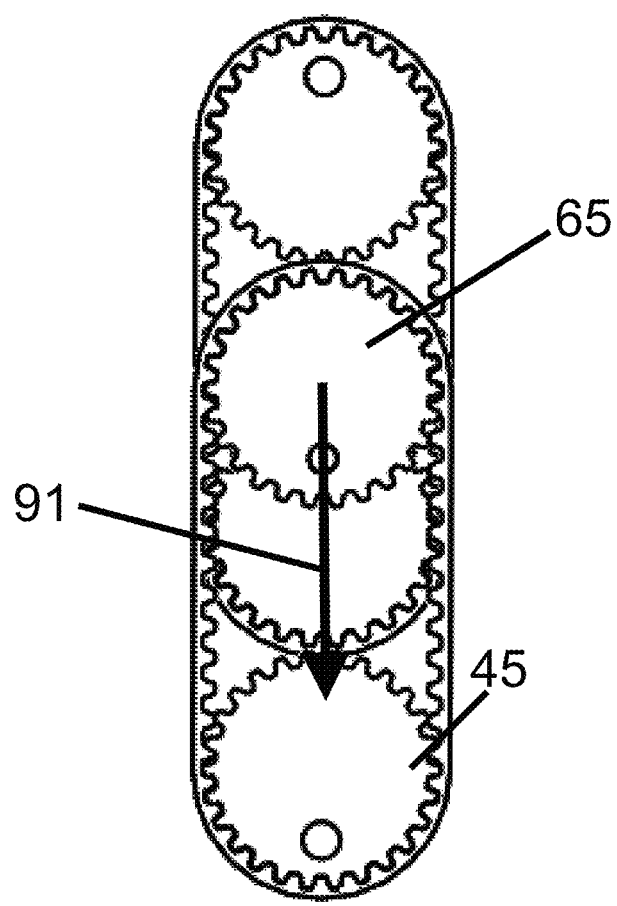
FIG. 11 is zero torque due to zero moment arm

The torque is the cross product of the centrifugal forces of the rotatable masses (45), and the moment arm (97), of the arm assembly (31). The moment arm (97), is the distance from the center of the arm assembly shaft (63), to the center of the arm assembly sprockets (65), FIG. 10. FIG. 10 shows the orientation of the masses as clockwise torque is generated. FIG. 11 shows the orientation of the masses when zero torque is generated as the effective moment arm goes to zero. Counter-clockwise torque is generated, FIG. 12. Zero torque is generated as the effective moment arm goes to zero, FIG. 13.

Figure 14:
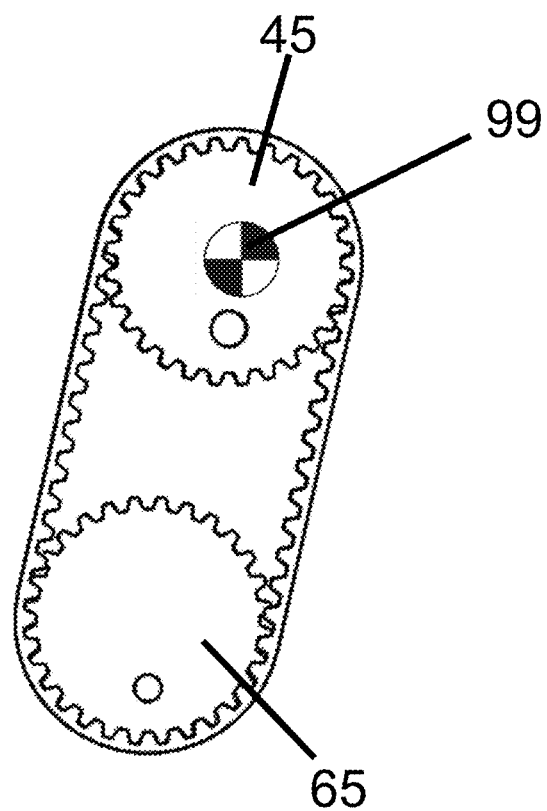
FIG. 14 is zero phase angle between the forward and aft drive units for maximum output torque
Figure 15:
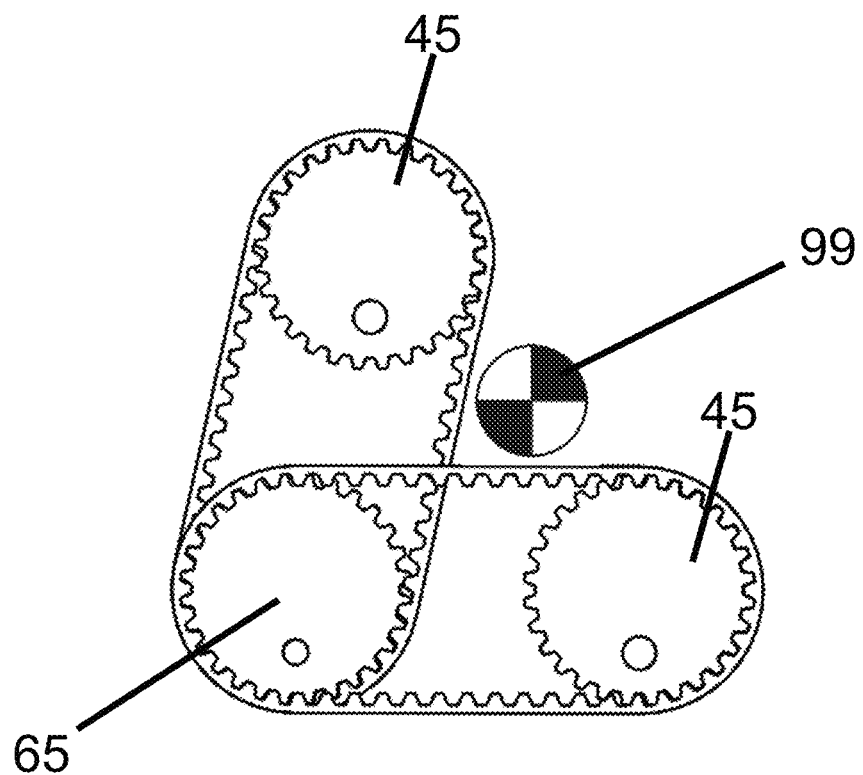
FIG. 15 is intermediate phase angle between the forward and aft drive units for intermediate output torque
Figure 16:
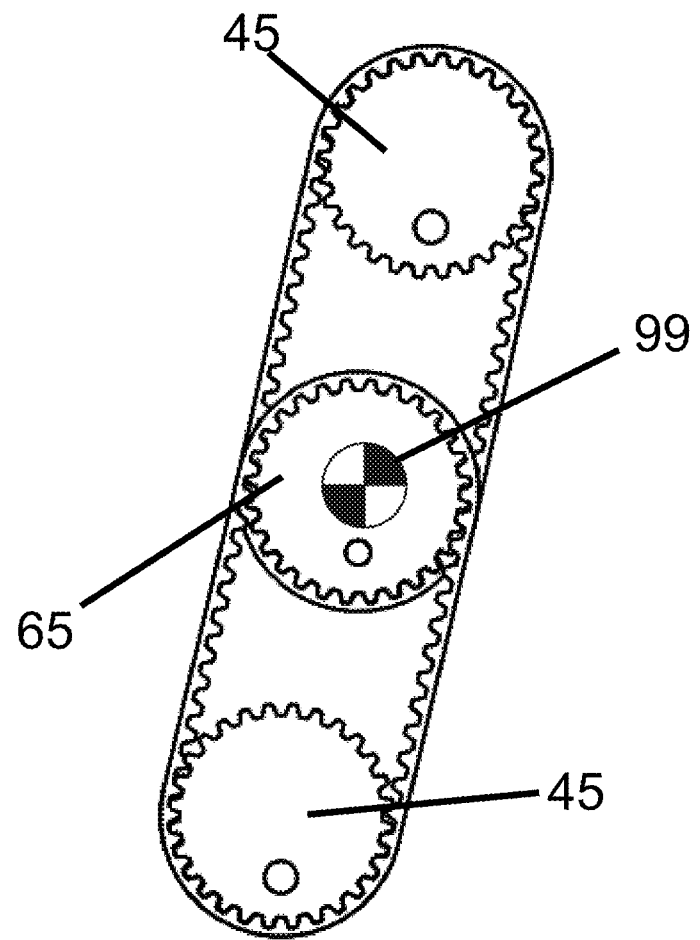
FIG. 16 is 180° phase angle between the forward and aft drive units for zero output torque
Figure 17:
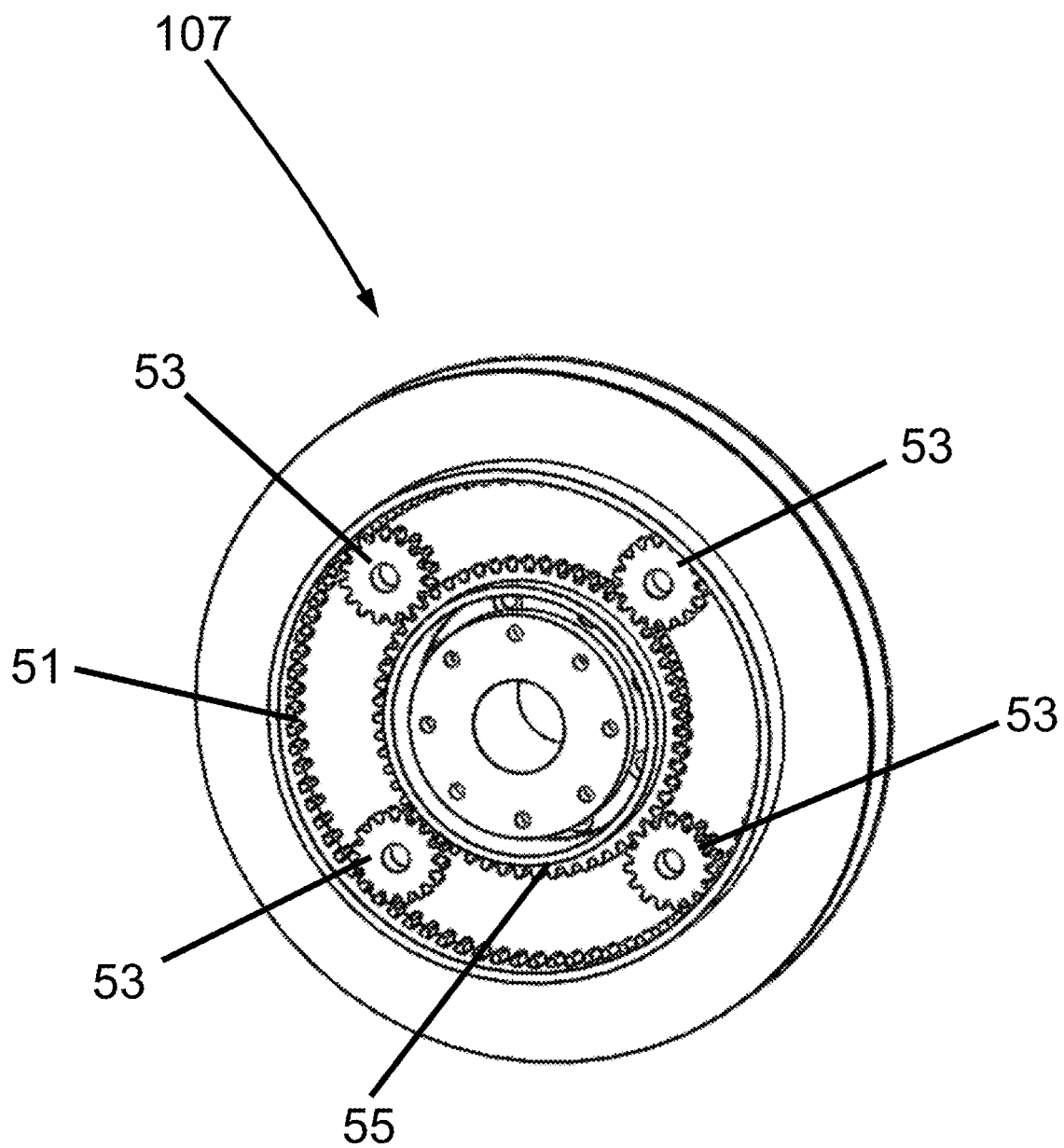
FIG. 17 is planetary gear set for the torque amplitude control system
Figure 18:
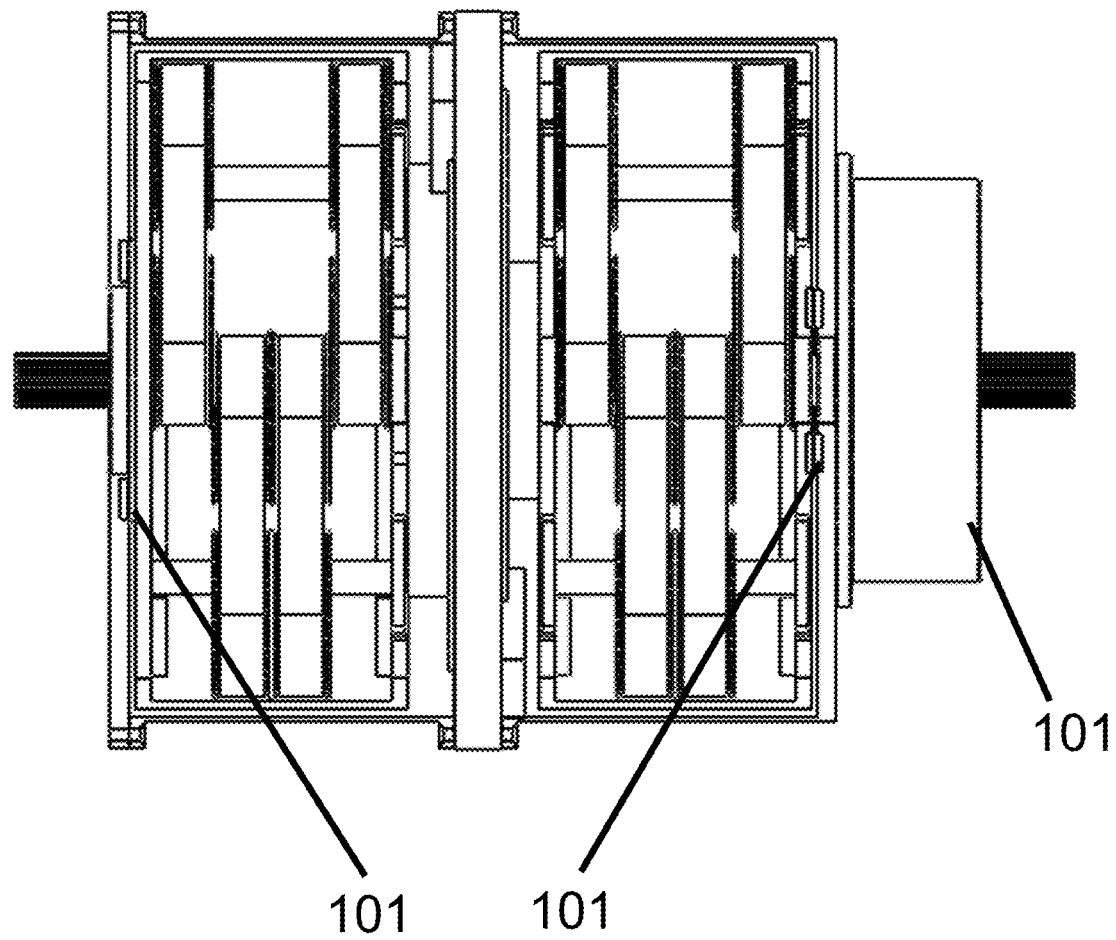
FIG. 18 is instrumentation installations for the torque amplitude control system While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

The infinitely variable torque is achieved by the adjusting of the phase angle between the forward drive unit (35) and aft drive unit (37). FIGS. 14, 15 and 16 illustrate how the output torque is controlled by the adjustment of the phase angle between the forward drive unit (35), and aft drive units (37). In these figures the profile of a rotatable masses (45), from the forward drive unit (35) and the aft drive unit (37), are shown with their respective timing belts (43) and arm assembly sprockets (65).

Figure 12:
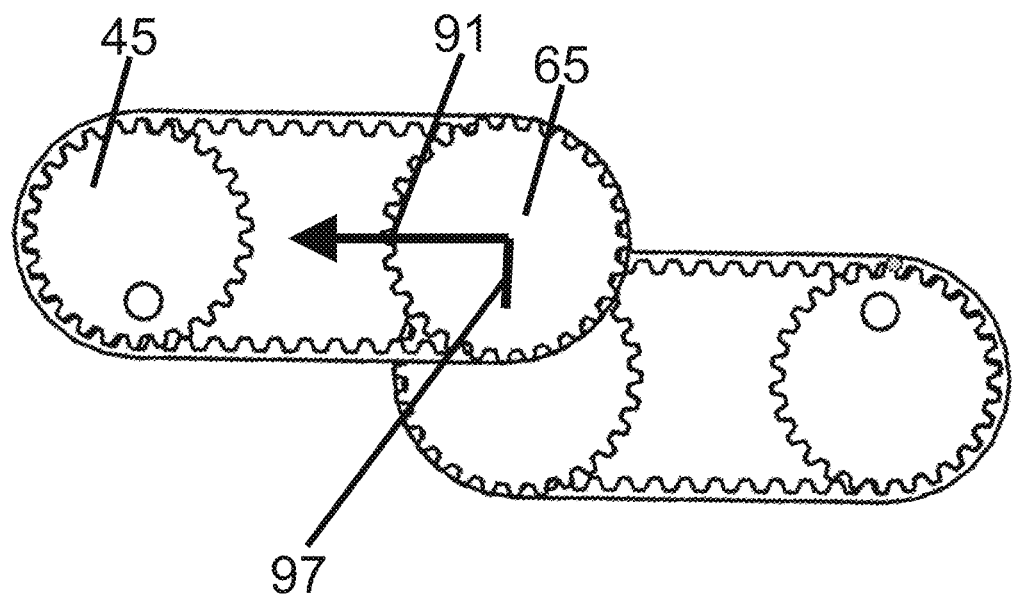
FIG. 12 is counter clockwise torque from the centrifugal forces from the rotatable masses
Figure 13:
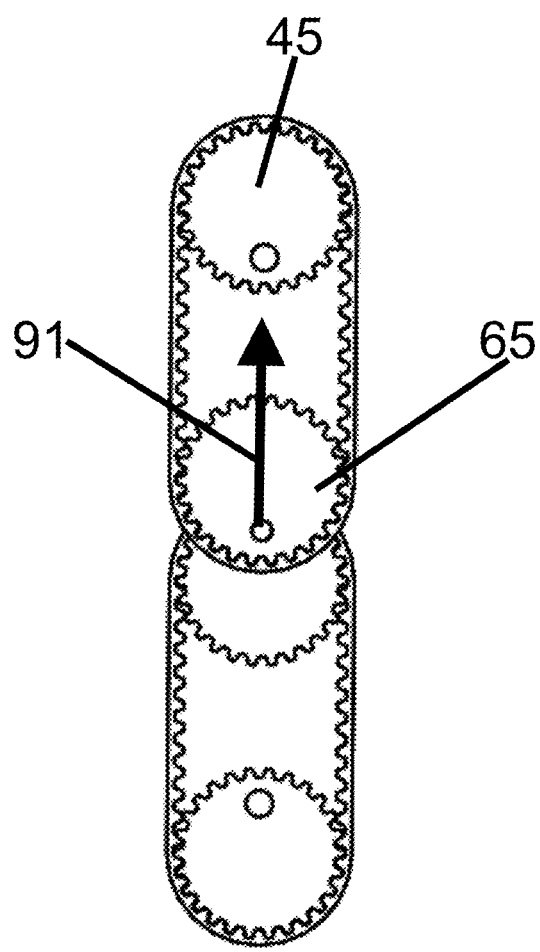
FIG. 13 is zero torque due to zero moment arm

The adjustment of the phase angle between forward drive unit (35), and aft drive unit (37), changes the combined center of gravity (99), of the rotatable masses 45. Maximum torque occurs when the forward drive unit (35) and the aft drive unit (37) are in phase which is a phase angle of 0°, FIG. 14. The center of gravity (99), of the rotatable masses (45), are at the maximum distance from the center of the arm assembly sprockets (65). An intermediate torque is illustrated in FIG. 15. The center of gravity (99), of the rotatable masses (45), is closer to the center of the arm assembly sprockets (65). Zero torque occurs when the forward drive unit (35), and aft drive unit (37) are out of phase by 180°, (FIG. 12). The center of gravity (99), of the rotatable masses (45), is at the center of the arm assembly sprockets (65).

The torque amplitude control system (61), can change the phase angle between the forward drive unit (35), and the aft drive unit (37), to any value from 0° to 180° in a fraction of a second. The control system (61), continuously operates to change the phase angle between the forward drive unit (35), and the aft drive unit (37), as needed. It's a compact unit that fits between the forward drive unit (35), and the aft drive unit (37), FIGS. 3 and 4.

The torque amplitude control system (61), is a compact device and adjusts the torque amplitude by controlling the phase angle between the forward drive unit (35) and the aft drive unit (37) of the input assembly (29), of the IVT. The device consists of sensors (101), an electronic control unit (ECU), embedded software and mechanical components.

The sensors (101), measure the IVT (1), input speed (rpm), IVT (1), output speed (rpm), phase angle between the forward drive unit (35), aft drive unit (37), and engine data. This data from the sensor (101), measurements are provided the real time to the ECU.

The ECU is a printed circuit board (PCB) that processes the sensor measurements, executes the embedded software and sends commands to the brake actuators (103), to adjust the phase angle between the forward drive unit (35) and the aft input drive unit (37), of the input assembly (31). The ECU and wires are not shown in the figures The embedded software is the computer code that processes the sensor (101), measurements, calculates new phase angle between the forward drive unit (35), and the aft drive unit (37) and sends the commands to the brake actuator (103), to change the phase angle to the new value.

The mechanical components are the structural and actuator parts which are used to maintain and adjust the phase angle between the forward and aft drive units. The mechanical components are installed in between the forward drive unit (35), and the aft drive unit (37). The mechanical components are an indexing clutch, two calipers (103), two brake discs (109), planetary gear set (107), and support structure. The calipers (103), are fixed to the casing while the brake discs are attached the drive units (35) (37). One the caliper, and brake disk is used to increase the phase angle while the other pair reduces the phase angle. The planetary gear (107), set is used reverse the direction of the torque of one set of the calipers (103), and brake disk (109). The planetary gear set (107) consist of a sun gear (55), idler gears (53), and a ring gear (51).

The indexing clutch (57), is in a lock-lock setting when there is no torque from the calipers (103). The indexing clutch (57), changes to a free-wheel and lock setting when the one of the brakes (103), applies torque to the clutch (57). The free-wheel direction is in the direction of the applied torque. Only one of the brakes operate at any instant of time.

The time duration for changing the phase angle from maximum torque to zero torque is less than 0.20 seconds with a braking torque less than 20 lb-ft. The time duration for changing the phase angle from zero torque to maximum torque is less than 1.00 seconds with a braking torque less than 150 lb-ft for worst case. The time duration for small changes in the phase angle will take less than 0.20 seconds.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system comprising:
    an infinitely variable transmission (IVT) having:
        an input assembly configured to produce oscillating torque and configured to be directly connected to a power source, the input assembly having a forward drive unit and an aft drive unit;
        an output assembly configured to convert the oscillating torque into a unidirectional torque; and
        an arm assembly configured to create a structural interface between the input assembly and the output assembly;
    a control system configured to create a structural interface between the forward drive unit and the aft drive unit and configured to control a phase angle between the forward drive unit and the aft drive unit, the control system having:
        one or more sensors configured to measure an IVT input speed, an IVT output speed, a current phase angle between the forward drive unit and the aft drive unit, and engine data;
        an electronic control unit configured to process data from the one or more sensors and use software to send one or more commands to a plurality of structural components of the system to adjust the phase angle between the forward drive unit and the aft drive unit;
        the plurality of structural components comprising:
            a casing;
            a first caliper fixed to the casing;
            a first brake disk attached to one of the forward drive unit and the aft drive unit;
            the first caliper and first brake disk configured to increase phase angle;
        a second caliper fixed to the casing;
        a second brake disk attached to one of the forward drive unit and the aft drive unit;
        the second caliper and the second brake disk configured to decrease phase angle;
        an indexing clutch;
        a planetary gear set configured to reverse the direction of a torque of one set of the calipers and brake disk.

2. The system of claim 1, wherein the planetary gear set further comprises:
    a sun gear;
    a plurality of idler gears; and
    a ring gear.

* * * * *